(12) United States Patent
Akelbein et al.

(10) Patent No.: US 7,752,206 B2
(45) Date of Patent: Jul. 6, 2010

(54) METHOD AND DATA PROCESSING SYSTEM FOR MANAGING A MASS STORAGE SYSTEM

(75) Inventors: Jens-Peter Akelbein, Bodenheim (DE); Jens Fauth, Wiesbaden (DE); Christian Mueller, Dichtelbach (DE)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 11/562,660

(22) Filed: Nov. 22, 2006

(65) Prior Publication Data

US 2007/0180001 A1    Aug. 2, 2007

(30) Foreign Application Priority Data

Jan. 2, 2006    (EP)    .................................. 06100012

(51) Int. Cl.
   *G06F 7/00*    (2006.01)
   *G06F 17/30*    (2006.01)
(52) U.S. Cl. ..................................................... 707/736
(58) Field of Classification Search .................. 707/204
   See application file for complete search history.

(56) References Cited

U.S. PATENT DOCUMENTS 5,991,753 A * 11/1999 Wilde ............................ 707/2

* cited by examiner

*Primary Examiner*—Mohammad Ali
*Assistant Examiner*—Alexey Shmatov
(74) *Attorney, Agent, or Firm*—John E. Campbell

(57) ABSTRACT

Managing a mass storage system that comprises a first and second storage space. A file index is generated listing each file along with a first characteristic quantity (FCQ), a second characteristic quantity (SCQ), and status information. Status information specifies if the file is held on the first or second storage space. A sample of files is selected from the file index containing a given number of files, wherein status information of each file specifies the first storage space. The FCQ of each file in the sample is used to determine the first critical value (FCV). The SCQ of each file in the sample is used to determine the second critical value (SCV). A first subset of files comprising each file where FCQ is larger than FCV, SCQ is larger than SCV, and specified by status information to be held on the first storage device is determined.

10 Claims, 5 Drawing Sheets

METHOD AND DATA PROCESSING SYSTEM FOR MANAGING A MASS STORAGE SYSTEM

CROSS-REFERENCE TO RELATED APPLICATION

This application claims the priority benefit under 35 U.S.C. §119 of European application 06100012.1, filed Jan. 2, 2006, and incorporated herein by reference.

FIELD OF THE INVENTION

The invention relates to a method and data processing system for managing a mass storage system in general and to a method and data processing system for managing the migration of a large amount of files from a storage space to another storage space in particular.

BACKGROUND AND RELATED ART

Mass storage systems are generally used for managing, storing, and retrieving a large number of files, which are typically organized in one file system. A mass storage system generally comprises a hierarchical storage management (HSM) system and high speed and slower storage devices on which the files are stored physically. An application that requests the storage or the retrieval of a file from the file system therefore does not have to know the location where the file is stored. The hierarchical storage management system migrates files that fulfill a certain criterion, for example files that are older than 100 days, from the high speed storage devices such as hard disc devices to slower storage devices such as tape drives. If a file has been migrated to the slower storage device and a user wants to access the file it is copied to the high speed storage device and then made available to the user. Thus, it takes longer to access files that are stored on the slower storage devices. Hence a hierarchical storage management system should arrange the files that are on the high speed storage devices and on the slower storage device in an intelligent way so that files that are often requested by a user are kept on the high speed storage device.

It would in principle be ideal to store all files on high speed storage devices all the time. However, high speed storage devices are generally more costly than slower storage devices so that through the utilization of slower storage devices the total cost of a mass storage system can be reduced.

If large numbers of files have to be managed by the hierarchical storage management system problems arise with respect to the selection of the appropriate files for migration. A threshold based auto-migration might start migrating files if a high threshold of the storage usage of the high speed storage device, which can for example be a tier 1 storage device, is reached. Typically eligible files are determined up front. If the number of files is very large, for example larger than $10^8$ files, a query on all files that has to be performed in order to determine the files for migration requires a significant amount of time. Furthermore, the most eligible files are hard to find as all files stored on the high speed memory device need to be scanned through first for determining the criteria for more and less eligible files. A second query is required to search for files based on the criteria of the first ones. Thus it is hard to determine criteria for eligible candidates in a timely manner. Eligible candidates for migration might for example be files that are relatively old or relatively large, while candidates that should be left on the fast speed storage device are files that are relatively young and small.

The hierarchical storage management system of the IBM Tivoli Storage Manager (TSM) system uses for example a candidate list which contains a subset of the set of all files contained in a file system. The subset is optimized continuously by iterating through the file system. As the candidate list contains a maximum number of entries files not contained in the list cannot be identified as candidates. Hence the candidate list contains only a limited number of eligible files. Whenever new eligible candidates are found other files have to be moved out of the candidate list. This results in significant CPU usage and input/output accesses of the file system if $10^8$ to $10^9$ files need to be managed by the hierarchical storage management system.

There is therefore a need for an improved method and data processing system for managing a mass storage system.

SUMMARY OF THE INVENTION

In accordance with an embodiment of the invention, there is provided a method for managing a mass storage system wherein the mass storage system comprises a first storage space and a second storage space. A file index is generated which lists in a uniformly distributed way each file along with a first characteristic quantity, a second characteristic quantity, and a status information, wherein the status information specifies if the file is held on the first storage space or on the second storage space. A sample of files is selected from the file index. The sample of files contains a given number of files, wherein the status information of each file of the given number of files specifies the file to be held on the first storage space. The first critical value is determined by use of the first characteristic quantity of each file comprised in the sample of files and a second critical value is determined by use of the second characteristic quantity of each file of the sample of files. Then, a first subset of files comprising each file for which the first characteristic quantity is larger than the first critical value and for which the second characteristic quantity is larger than the second critical value and which is specified by the status information to be held on the first storage device is determined.

A file index is generated which lists each file of the file system along with a first and a second characteristic quantity and along with a status information. The files are listed in a uniformly distributed way. Hence, the files are listed in the file index in a way which is completely decoupled from the arrangement of the files on the first and on the second storage space. A sample of files is selected out of the file index. The sample of files contains a given number of files which are held on the first storage device. The files held on the first storage device can be identified by checking the status information of each file before it is assigned to the sample of files. By use of the first characteristic quantity of the files that are contained in the sample of files a first critical value is determined. Similarly by use of the second characteristic quantity of the files comprised in the sample of files a second critical value is determined. A first subset of files is determined which comprises all files that are contained in the file index for which the first characteristic quantity is larger than the first critical value and for which the second characteristic quantity is larger than the second critical value and for which the status information specifies the file to be stored on the first storage space.

Only the first and the second characteristic quantities of the files that are contained in the sample of files are used for the determination of the first and the second critical value. The given number of files contained in the sample of files can be much smaller than the total number of files contained in the file index. Thus, the first and the second critical values can be determined quickly. Since the files are listed in the file index in a uniformly distributed way, the sample of files contains a representative distribution of files and hence the first critical value and the second critical value provide useful quantities for classifying all files of the file index.

In accordance with an embodiment of the invention, a second subset of files is determined, wherein the second subset of files comprises each file for which the first characteristic quantity is smaller than the first critical value but larger than a first threshold value and for which the second characteristic quantity is larger than the second critical value and which is specified by the status information to be held by the first storage space. The third subset of files is determined which comprises each file for which the first characteristic quantity is larger than the first critical value and for which the second characteristic quantity is smaller than the second critical value but larger than a second threshold value and which is specified by the status information to be held by the first storage space. Moreover a fourth subset of files comprising each file for which the first characteristic quantity is smaller than the first critical value but larger than the first threshold value and for which the second characteristic quantity is smaller than the second threshold value but larger than the second threshold value is determined.

The files contained in the file index are classified into a first, a second, a third or a fourth subset of files if they fulfill the conditions given above. By use of the file index and by use of the first critical value, the second critical value, the first threshold value and the second threshold value eligible candidates that for example could be moved from the first storage space are identified. The method in accordance with an embodiment of the invention is particularly advantageous as the file index needs to be derived from time to time and the first critical value as well as the second critical value are only determined by use of a sample out of the file index. Thus, the first critical value and the second critical value can be determined very quickly because not the whole file index is used.

In accordance with an embodiment of the invention, a given number of files of the first subset of files is moved from the first storage space to the second storage space if more than the given number of files are contained in the first subset of files and all files are moved from the first subset of files contained in the first storage space to the second storage space if less than the given number of files are contained in the first subset of space. Moreover the remaining number of files of the second subset of files or of the third subset of files or of the fourth subset of files are moved so that in total the given number of files is moved from the first storage space to the second storage space. The first subset of files, the second subset of files, the third subset of files and the fourth subset of files is updated.

Thus by use of the classification of the files into the first, second, third and fourth subset of files eligible candidates for moving files are determined. Preferably the files in the first subset of files for which the first characteristic quantity is larger than the first critical value and for which the second characteristic quantity is larger than the second critical value are moved. If a given number of files is supposed to be moved and more files than the given number of files are contained in the first subset of files then the given number of files are moved from the first subset of files. However, if more files are supposed to be moved than are contained in the first subset of files, files from the second subset of files and/or from the third subset of files are moved to the second storage space. Moreover, if there are not sufficient files contained in the second and in the third subset of files, files from the fourth subset of files are moved. The total number of files can refer to a number which is specified by an administrator. The total number of files can also be given implicitly, for example by the specification of a given amount of storage that has to be made available on the first storage space. Then, as much files as required to free the given amount of storage are moved from the first storage space to the second storage space.

In accordance with an embodiment of the invention, the first subset of files, the second subset of files, the third subset of files, and the fourth subset of files are determined dynamically before the given number of files are moved from the first storage space to the second storage space, and files from the fourth subset of files are only moved if not sufficient files are contained in the first subset of files, in the second subset of files and in the third subset of files. Thus the files that are contained in the first subset of files, in the second subset of files, in the third subset of files and in the fourth subset of files are only determined before the migration of files from the first storage space to the second storage space is scheduled. This has the advantage that the various subsets of files are up to date.

In accordance with an embodiment of the invention, a file index is regenerated depending on the number of new files added to the mass storage system or depending on the number of files contained in the first, second, third or fourth subset of files.

In accordance with an embodiment of the invention, the first characteristic quantity specifies the age of a file and the second characteristic quantity specifies the size of a file. Thus in this embodiment of the invention, the first characteristic quantity that is listed for each file in the file index refers to the age of the file. The age of a file generally refers to the period of time since the file has been accessed for the last time. The age of the file could however also refer to the period of time since the file has been created. The second characteristic quantity refers to the size of the file. A first critical value that is determined by use of the first characteristic quantity of each file would then be a value which specifies a certain file age. The second critical value which is used by use of the second characteristic quantity would then be a value which would specify a certain file size.

In accordance with an embodiment of the invention, the first critical value is determined by calculating the average age of the files contained in the sample of files, and the second critical value is determined by calculating the average space occupied by the files contained in the sample of files.

In accordance with an embodiment of the invention, the mass storage system is a hierarchical storage management system, wherein the first storage space is provided by a tier one storage device and wherein the second storage space is provided by a tier two storage device.

In accordance with an embodiment of the invention, the first storage space and the second storage space are provided by one storage device or alternatively the first storage space and the second storage space are provided by two separate storage devices.

The first storage space could for example be allocated on one partition of a storage device while the second storage space could be allocated on another partition of the same storage device. Files could then be stored on the second storage space in a compressed way. Alternatively, the first storage space could be provided by a high-speed storage device while the second storage space is provided by a slower storage device.

In accordance with an embodiment of the invention, the access of entries within the file index is carried out by use a hash algorithm, wherein the hash algorithm is used for storing and retrieving the attributes and the information status of each file held by the first or second storage space in the file index, and wherein the first and second characteristic quantities are comprised in the attributes of each file.

The file index is generated by scanning all files that are contained in the first storage space and in the second storage space and by using a hash algorithm for arranging the files in the file index. Due to the use of the hash algorithm the files are listed in a uniformly distributed way in the file index. This has the advantage that any sample of files which is taken out of the complete list of files represents a normalized distribution of files that are contained in the file index. In the random sample that is taken out of the file index no local deviations will show up if an appropriate sample size is chosen. The size of the sample, the given number of files that are contained in the sample, can therefore be much lower than the number of files that are contained in the first and in the second storage space. For example, in the first storage space and in the second storage space more than $10^8$ or $10^9$ files can be contained while 10,000 files can only be listed in the sample of files. In principle there is no reason for not keeping the number of files in the sample at a very low number for since due to the uniformly distributed way of the file index, the sample of files is a representative profile of the file index and thereby a representative profile of the mass storage system.

In another aspect, an embodiment of the invention relates to a computer program product comprising computer executable instructions for performing a method in accordance with any one of the preceding claims.

In another aspect, an embodiment of the invention relates to a data processing system for managing a mass storage system, wherein the mass storage system comprises a first storage space and a second storage space, and wherein the data processing system comprises means for generating a file index which lists in a uniformly distributed way each file along with a first characteristic quantity, a second characteristic quantity, and a status information. The status information specifies if the file is held on the first storage space or on the second storage space. The data processing system further comprises means for selecting a sample of files from the file index which contains a given number of files and wherein the status information of each file of the given number of files specifies the files to be held on the first storage space. The data processing system further comprises means for determining a first critical value by use of the first characteristic quantity of each file of the sample of files and means for determining a second critical value by use of the second characteristic quantity of each file of the sample of files and further means for determining a first subset of files comprised in each file for which the first characteristic quantity is larger than the first critical value and for which the second characteristic quantity is larger than the second critical value and which is specified by the status information to be held by the first storage space.

BRIEF DESCRIPTION OF THE DRAWINGS

In the following, preferred embodiments of the invention will be described in greater detail by way of example only making reference to the drawings in which.

DETAILED DESCRIPTION

Figure 1:
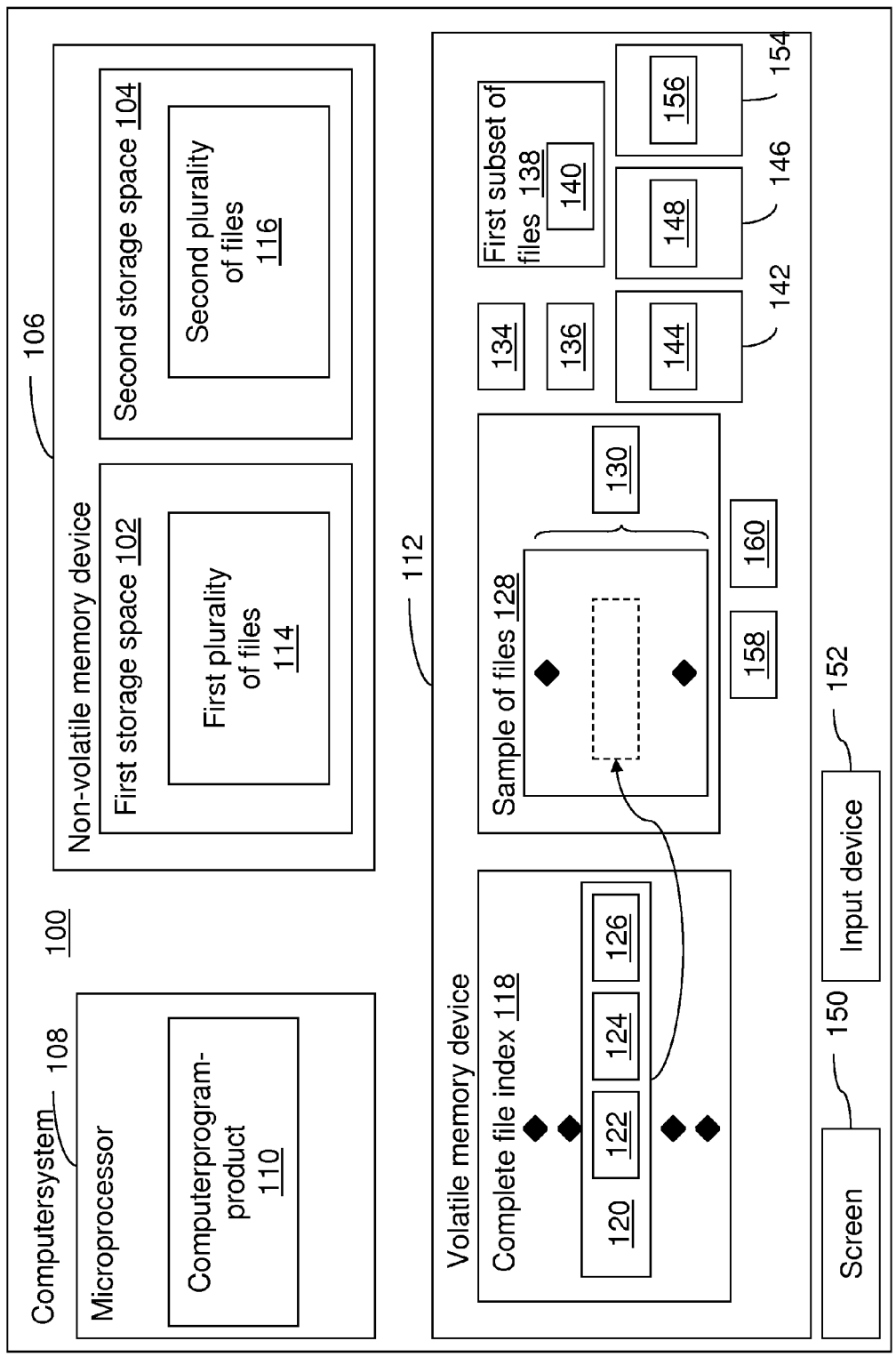
FIG. 1 shows a block diagram of a computer system comprising a mass storage system.

FIG. 1 shows a block diagram of a computer system 100 comprising a mass storage system. The computer system 100 comprises a non-volatile memory device 106, a microprocessor 108, a volatile memory device 112, a screen 150, and an input device 152. The mass storage system comprises the first storage space 102 and the second storage space 104, that are in this example both allocated on the non-volatile memory device 106. The first storage space 102 holds a first plurality of files 114, for example more than $10^8$ files. The second storage space 104 holds a second plurality of files 116, for example also more than $10^8$ files.

The microprocessor 108 executes a computer program product 110 which is also part of the mass storage system. The computer program product 108 comprises instructions for performing the method in accordance with an embodiment of the invention. A file index 118 is generated by scanning the first storage space 102 and optionally the second storage space 104 as well. The file index 118 is stored on the volatile memory device 112. It is permanently stored on the first storage space 102. It might also be that the file index 118 is only partly loaded into the volatile memory device 112, especially if this index is large.

The file index 118 lists each file that is stored in the first storage space 102 and optionally in the second storage space 104. The file index therefore lists each file of the first plurality of files 114 and of the second plurality of files 116. For a file 120 listed in the file index 118, a first characteristic quantity 122, a second characteristic quantity 124, and a status information 126 is further stored in the file index 118. The status information 126 specifies if the file is held on the first storage space 102 or on the second storage space 104. The status information 126 can further specify the address of the file, e.g. the position at which it is stored on the first or on the second storage space 102 or 104, so that it can be immediately accessed. In an embodiment of the invention, the file index is generated by scanning the first storage space 102 and the second storage space 104 and by using a hash algorithm for storing file information of each file of the first plurality of files 114 or of the second plurality of files 116 within the file index 118. Usually the hash algorithm allows to store more than just the first and the second characteristic quantities in an efficient way. A lot of attributes can be stored by use of the hash algorithm in an efficient way. The first characteristic quantity and the second characteristic quantity are then within the attributes. The same holds for the information status, which specifies the position at which the file is stored on the non-volatile memory device 106. The files are listed in the file index 118 in a uniformly distributed way, which is for example ensured by use of the hash algorithm.

A sample of files 128 is selected from the file index 118. The sample of files 128 contains a given number 130 of files out of the file index 118. The files of the sample of files 128 can for example be taken from the first files that are listed in the file index 118 or they can be picked out randomly from the file index 118. The given number 130 can for example be set by a system administrator. For example when initializing the system, a request visualized on the screen 150 would demand the system administrator to type in by use of the input device 152 the given number 130, which would be stored on the volatile memory device 112 or alternatively on the non-volatile memory device 106.

Only files that are physically stored within the first storage space 102 are taken into account for the sample of files 128. This can be done by checking the status information of a selected file before it is assigned to the sample of files 128. For example, if file 120 is assigned to the sample of files 128, then the status information 126 has been checked before in order to ensure that the file 120 is initially stored on the first plurality of files 114.

A first critical value 134 is determined by use of the first characteristic quantity of each file that is contained in the sample of files 128. Thus by use of the first characteristic quantity 122 of file 120 along with the other first characteristic quantities of the other files of the sample of file 128, the first critical value 134 is determined.

A second critical value 136 is determined by use of the second characteristic quantity of each file that is contained in the sample of files 128. Thus by usage of the second characteristic quantity 124 of file 120 along with the other second critical quantities of all other files contained in the sample of files 128, the second critical value 136 is determined. The first and the second critical values 134 and 136 are stored on the volatile memory device 112 or alternatively on the non-volatile memory device 106.

A first subset of files 138 is determined. A file 140 from the file index 118 is assigned to the first subset of files 138, whereby its first characteristic quantity is larger than the first critical value 134 and whereby its second characteristic quantity is larger than the second critical value 136 and for which the status information 158 specifies the files to be held on the first storage space 112.

A second subset of files 142 is further determined which comprises all files 144 from the file index 118 that have a first characteristic quantity that is smaller than the first critical value 134 but larger than a first threshold value 158 and that have a second characteristic quantity that is larger than the second critical value 136 and that are specified by the status information to be stored on the first storage space 102.

A third subset of files 146 is further determined which comprises all files 148 from the file index 118 that have a first characteristic quantity that is larger than the first critical value 134 and that have a second characteristic quantity that is smaller than the second critical value 136 but larger than a second threshold value 160, and that are specified by the status information to be stored on the first storage space 102.

A fourth subset of files 154 is further determined which comprises all files 156 from the file index 118 that have a first quantity that is smaller than the first critical value 134 but larger than the first threshold value 158 and that have a second characteristic quantity that is smaller than the second critical value 136 but larger than the second threshold value 160, and that are specified by the status information to be stored on the first storage space 102. The first threshold value 158 and the second threshold value 160 are constant values that are specified for example by the system administrator.

The first subset of files 138, the second subset of files 142, the third subset of files 146, and the fourth subset of files 154 therefore comprise files that fulfill the conditions given above. In principle, the subsets of files 138, 142, 146, and 154 could be used for example by the system administrator to derive statistics about the first storage space 102. In a preferred embodiment of the invention, the subset of files 138, 142, 146, 154 are used to identify candidate files that are supposed to be moved from the first plurality of files 114 to the second plurality of files 116. Preferably, the files comprised in the first subset of files 138 are moved first, then the files comprised in the second and third subset of files 144 and 148 are moved. Finally, if all files of the first, second and third subset of files have been moved, files from the fourth subset of files 154 are moved from the first storage space 102 to the second storage space 104. Typically a given number of files out of the first subset of files 136 will be moved. The given number can be chosen so that for example a certain amount of storage space is made available on the first storage space 102. If more files than available in the first subset of files 138 have to be moved then files contained in the second subset of files 142 and/or in the third subset of files 146 will be moved. Finally, if not enough files are contained in the first, second and third subset of files 138, 142 and 146, files from the fourth subset of files 154 will be moved. After the files have been moved, the files contained in the first subset of files 138, and the second subset of files 142, and the third subset of files 146 and in the fourth subset of files 154 have to be updated accordingly. This means in principle that the files that have been moved from the first plurality of files 114 to the second plurality of files 116 have to be cancelled out of the corresponding subset of files. Accordingly the file index 118 has to be updated which means that the status information of the files that have been moved from the first storage space 102 to the second storage space 104 has to be changed.

Typically, the first subset of files 138, the second subset of files 142, the third subset of files 144 and the fourth subset of files 154 are determined dynamically before files are moved from the first storage space to the second storage space. This ensures that the various subset of files 138, 142, 146 and 154 contain files that fulfill the requirements set by the first critical values 134 and 136 at the moment in time when a migration is scheduled.

The file index 118 is regenerated when the number of files that are contained in the first, second, third or fourth subset of files 138 becomes so low that basically not enough files are contained in these subset of files for providing a sufficient way to generate enough free space in the first storage space.

In a preferred embodiment, the first characteristic quantity of a file corresponds to the age of the file. The second characteristic quantity corresponds to the size of the file. The first critical value 134 is then for example a specific file age. The second critical value 136 is then a specific file size. Various possibilities to determine these values will be described below. The first threshold value 158 would then be another specific file age, and the second threshold value 160 would then refer to another specific file size. Files contained in the first subset of files 138 are the files that are relatively old and relatively large, since these files have a first characteristic quantity 134 that is larger than the first critical value 158 and they have a second characteristic quantity 136 that is larger than the second critical value 160.

In the example shown in FIG. 1, the first storage space 102 and the second storage space 104 are allocated on one non-volatile memory device 106. The non-volatile memory device 106 can for example be a hard disc drive. The first storage space 102 can then be an allocated space on the hard disc drive. The second storage space can then for example be storage space in which files are stored on the hard disc in a comprised way. In another embodiment of the invention, the first storage space can be on a hard disc and the second storage space could be allocated on a different storage device, which could for example be a tape drive. Moreover the first storage space could for example be located on a client computer system so that a user has fast and quick access to the data stored in the files contained on the first storage space. The second storage space could then be a storage space which is located on a server computer that is connected by an internet connection to the client computer so that data which is contained on the server computer could only be made available to the user on the client computer in a slower way.

Figure 2:
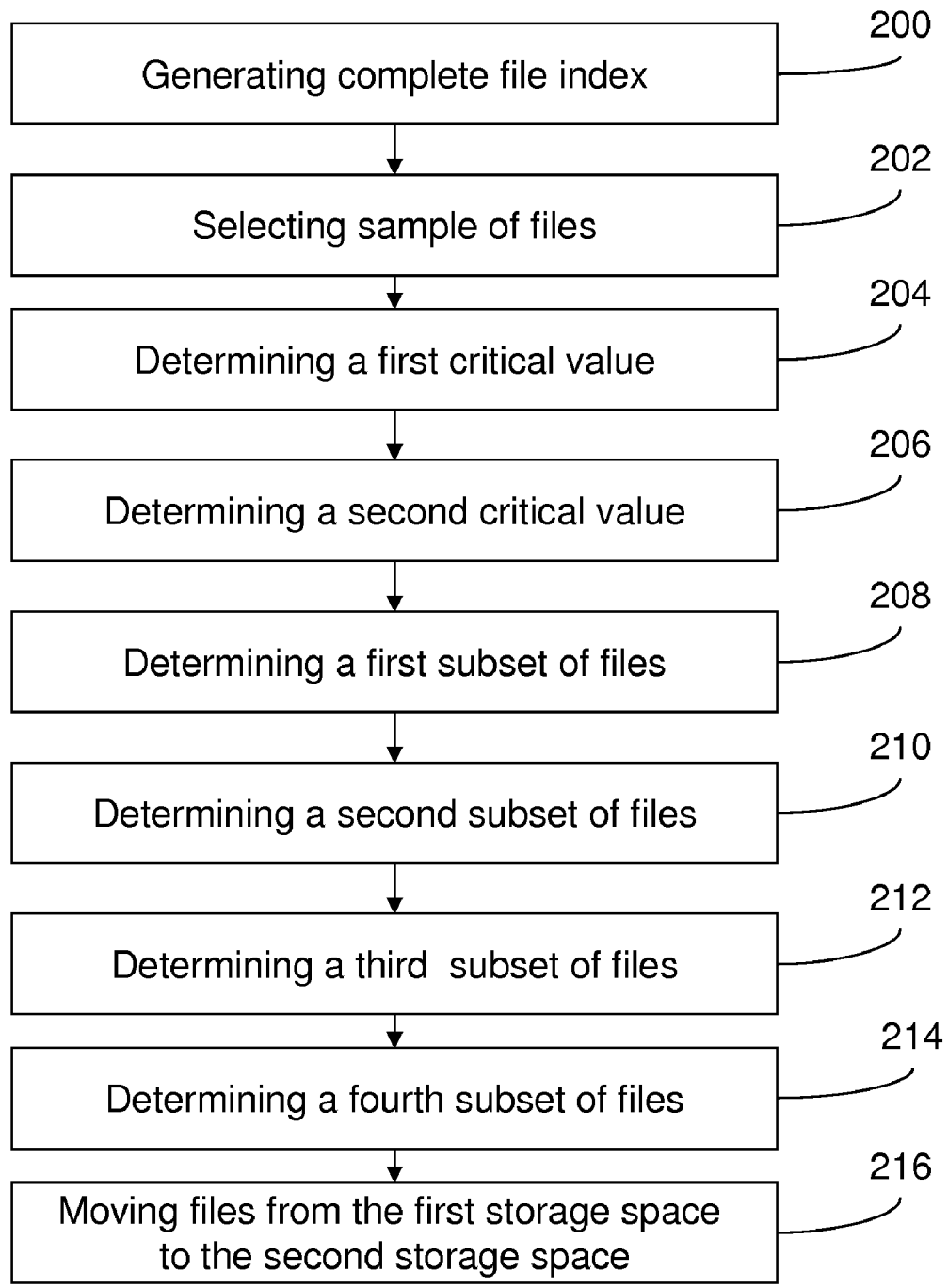
FIG. 2 depicts a flow diagram illustrating the basic steps performed by the method in accordance with an embodiment of the invention.

FIG. 2 depicts a flow diagram illustrating the basic steps performed by the method in accordance with an embodiment of the invention. In step 200 a file index is generated which lists in a uniformly distributed way each file along with a first characteristic quantity, a second characteristic quantity, and a status information. The status information specifies the file to be held on the first storage space or on the second storage space. In step 202 a sample of files is selected from the file index. The sample of files contains a given number of files, and the status information of each file of the given number of files specifies the files to be held on the first storage space. In step 204 a first critical value is determined by use of the first characteristic quantity of each file of the sample of files and in step 206 a second critical value is determined by use of the second characteristic quantity of each file of the sample of files. In step 208 the first subset of files is determined.

In an embodiment of the invention, the method proceeds with step 210 in which the second subset of files is determined, and with step 212 in which the third subset of files is determined, and with step 214 in which the fourth subset of files is determined. Furthermore, in step 216 files are migrated from the first storage space to the second storage space preferably from the first subset of files.

Figure 3:
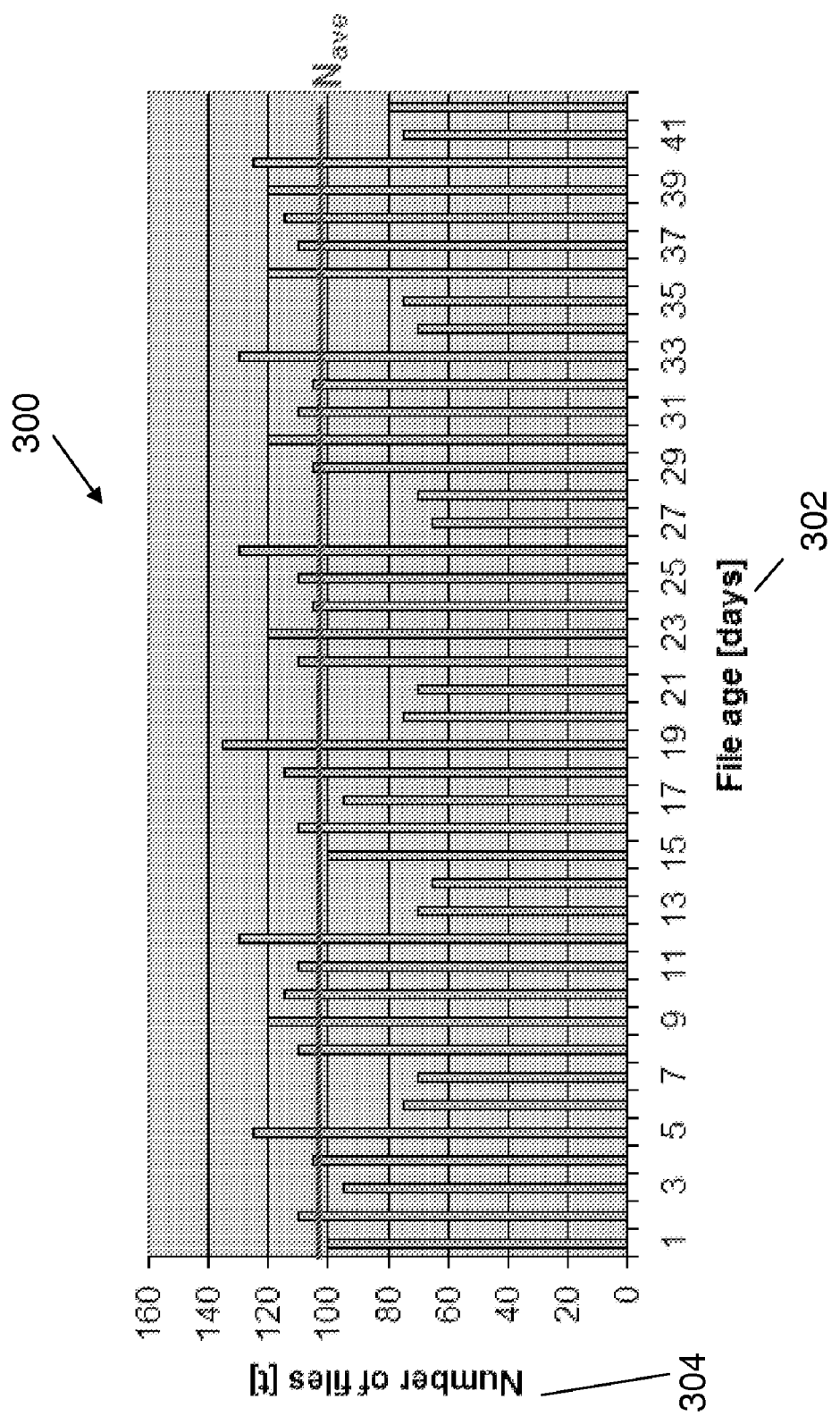
FIG. 3 depicts a typical distribution of files with the same age within a large file system.

FIG. 3 depicts a typical distribution 300 of the number of files over file age for a large file system. The x axis 302 refers to the file age in days, whereas the y axis 304 refers to the number of files. The age of a file refers usually to the period of time since the file has been accessed for the last time. As can be seen from the graph, the number of files with a certain age deviates barely with respect to the average number of files $N_{ave}$ 306. Thus, within a file system the number of files is more or less equally distributed with respect to the file age. In principle, one could use only one criteria, the file age, in order to determine files that are supposed to be migrated from the first storage space to the second storage space. For example one could migrate all the files that are older than one month. However as FIG. 3 shows, the number of files is more or less equally distributed with respect to the file age. Thus, the age of a file alone does not really provide a very useful criteria for migrating files.

Figure 4:
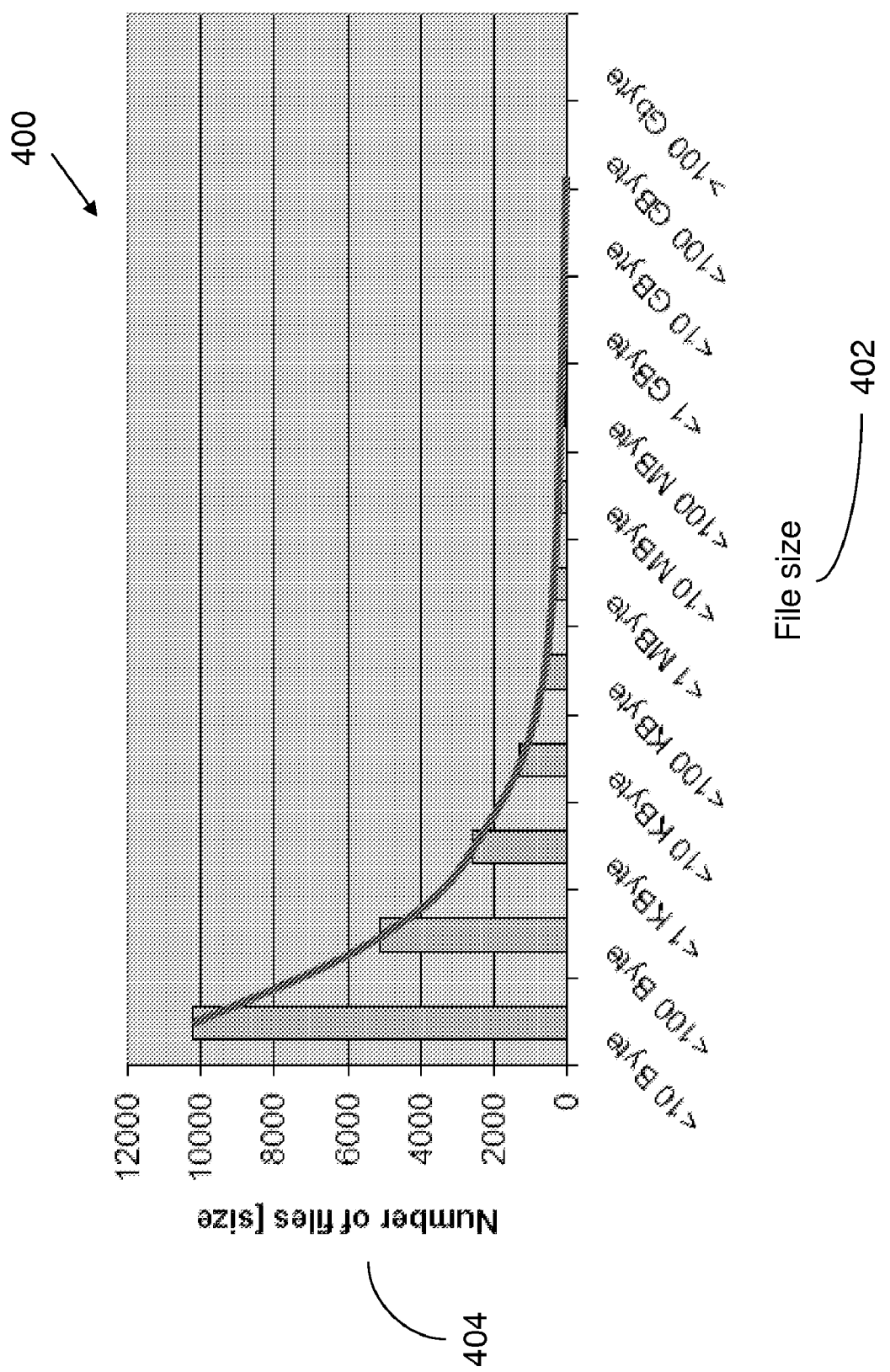
FIG. 4 shows a typical distribution of the number of files over file sizes.

FIG. 4 shows a typical distribution 400 of the number of files over file size. In this graph the number of files 404 is shown as a function of the file size 402. As can be seen the number of files 404 decreases with file size 404. Hence only a small number of files contain the majority of data that is stored while most of the other files are relatively small. Thus, the file size is a relative strong criterion for deciding if a file should be moved to the second storage space or not, since by moving only a few files, the largest ones, a relatively large amount of free space could be made available on the first storage space.

Figure 5:
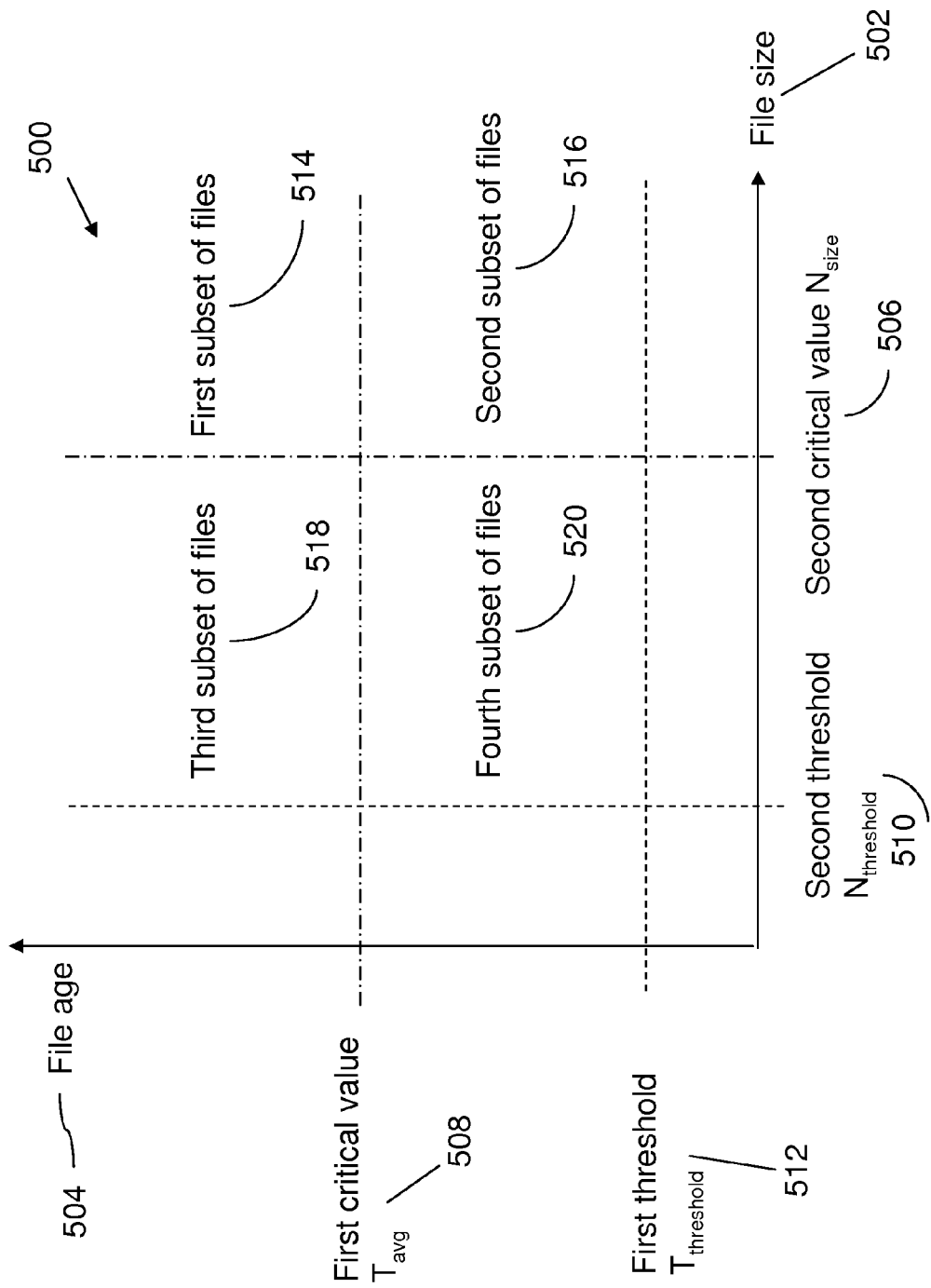
FIG. 5 illustrates graphically the criteria for determining the first, second, third, and fourth subset of files.

FIG. 5 illustrates graphically the criteria for determining the first, second, third, and fourth subset of files. The x-axis 502 of the graph 500 refers to the file size and the y-axis of the graph 504 refers to the file age. Any file of the file system that is specified by a first characteristic quantity, in this case its age, and by a second characteristic quantity, in this case the file size, could be placed at the corresponding coordinate in the graph 500.

The first critical value $T_{avg}$ is in this example a specific file age that is determined from the files contained in the sample of files. The first threshold value $T_{threshold}$ can for a example by a value that is set by the system administrator and refers to a minimum file age. Younger files are not foreseen to be moved at all. $T_{avg}$ can for example be determined from the average ages of the files in the sample of files that are older than $T_{threshold}$.

The second critical value $N_{size}$ 506 can be determined from the storage capacity C that is occupied by the files contained in the random sample. The second critical value $N_{size}$ 506 is for example half of the storage capacity $C_{50\%}$. The value can be computed iteratively by the following method:

Sort all files i by their file size;
For all files i do C:=C+file size of file i;
$C_{50\%}$:=C/2;
While (i:=0; sum=sum+file size of file i<$C_{50\%}$; i=i+1 at the end; size of file i equals size($C_{50\%}$))

The second threshold $N_{threshold}$ 510 can for example refer to a specific file size which is set by the system administrator and refers to a minimum file size. Smaller files are not supposed to be moved at all.

The first critical value $T_{avg}$ 508 and the second critical value $N_{size}$ 506 are the criteria by which the various subsets of files are separated by each other. Thus, the first subset of files 514 lies in the upper right quadrant of graph 500. The second subset of files 516 is below the first subset of files 514. The third subset of files 518 and the fourth subset of files 520 are separated by the first critical value $T_{avg}$ 508.

As long as enough files are available as migration candidates in the first subset of files 514 only these files should be migrated as these are the best candidates to be found. Therefore, the probability $P_i$ of selecting a file i is $P_i=1$. When no files are left in the first subset of files 514 also the other quadrants should be used for selecting files for migration. The second subset of files 516 and the third subset of files 518 are more appropriate than the fourth subset of files 520, so they will be queried first.

A possibility is to randomly choose files from the second subset of files 516 or from the third subset of files 518.

Another possibility is to choose the most appropriate files within the second and third subset of files for migration.

While one criterion (age or size) is already fulfilled in the second and third subset of files, the other one can be seen as a probability $P(Age_i)$ and $P(Size_i)$ between 0 and 1 depending on the actual age ($Age_i$) or size ($Size_i$). Files contained in the fourth subset of files 520 are the worst choice so they only should be selected if no file is left in the quadrants of the other subset of files The probability $P_i$ for files contained in the fourth subset of files need to be based on both actual values ($Age_i$, $Size_i$). In addition, the priority between age and size can be adjusted by weight factors ($Weight_{Age}$, $Weight_{Size}$). The weight factors can be chosen in a range of 0 to <1 where $Weight_{Age}+Weight_{Size}<1$.

The probability $P_i$ of a file is implemented as a random selection. The random selection itself can be implemented by a random number generator which generates a random number R for each file. If the random number R is smaller than the probability P of a file then the file will be migrated.

So the selection method can be represented by the following cases:

If file i contained in the first subset of files 514 : $p_i=1$
If file i contained in the third subset of files 518 : $P_i = P(Size_i)*Weight_{size}$
If file i contained in the second subset of files 518 : $P_i=P(Age_i)*Weight_{age}$
If file i contained in the fourth subset of files 520 : $p_i=0$ A file is taken from the first subset of files if R<$P_i$, which is always the case. From the third and second subset of files, files are taken for which R<$P_i$ which implies that older and larger files are selected with higher probability than younger and smaller files. R is always larger than $P_i=0$ of the fourth quadrant. Hence, no file is initially taken from the fourth quadrant.

One exception is given if no files are contained in the first, second and third subset of files For this condition the case 4 will be replaced in the following way:

If file i contained in the fourth subset of files : $p_i = P(Age_i)^* Weight_{age} + P(Size_i)^* Weight_{size}$ The first critical value 508 and the second critical value 506 for distinguishing the four quadrants are adapted after each scan of the file system where the attributes of a file get updated in the file index.

| List of Reference Numerals | |
| --- | --- |
| 100 | Computer system |
| 102 | First storage space |
| 104 | Second storage space |
| 106 | Non-volatile memory device |
| 108 | Microprocessor |
| 110 | Computer program product |
| 112 | Volatile memory device |
| 114 | First plurality of files |
| 116 | Second plurality of files |
| 118 | File index |
| 120 | File |
| 122 | First characteristic quantity |
| 124 | Second characteristic quantity |
| 126 | Status information |
| 128 | Sample of files |
| 130 | Given number of files |
| 132 | File in sample of files |
| 134 | First critical value |
| 136 | Second critical value |
| 138 | First subset of files |
| 140 | Files in subset of files |
| 142 | Second subset of files |
| 144 | Files in second subset of files |
| 146 | Third subset of files |
| 148 | File in third subset of files |
| 150 | Screen |
| 152 | Input device |
| 154 | Fourth subset of files |
| 156 | Files in fourth subset of files |
| 158 | First threshold value |
| 160 | Second threshold value |
| 300 | Distribution of files |
| 302 | x axis illustrating the file age |
| 304 | y axis showing the number of files |
| 306 | Average number of files |
| 400 | Distribution of files |
| 402 | x axis referring to the number of files |
| 404 | y axis referring to the file size |
| 500 | Graph |
| 502 | x axis referring to the file size |
| 504 | x axis referring to the file age |
| 506 | Second critical value |
| 508 | First critical value |
| 510 | Second threshold |
| 512 | First threshold |
| 514 | First subset of files |
| 516 | Second subset of files |
| 518 | Third subset of files |
| 520 | Fourth subset of files |

The invention claimed is:

1. A method for managing a mass storage system, said mass storage system comprising a first storage space and a second storage space, said method comprising:
   generating a file index, said file index listing in a uniformly distributed way each file along with a first characteristic quantity, a second characteristic quantity, and a status information, said status information specifying if said file is held on said first storage space or on said second storage space;
   wherein said first characteristic quantity specifies the age of a file and wherein said second characteristic quantity specifies the size of a file;
   selecting a sample of files from said file index, said sample of files containing a given number of files, wherein said status information of each file of said given number of files specifying said file to be held on said first storage space;
   using said first characteristic quantity of each file of said sample of files to determine a single first critical value;
   using said second characteristic quantity of each file of said sample of files to determine a single second critical value;
   wherein said first critical value is determined by calculating the average age of the files contained in said sample of files, and wherein said second critical value is determined by calculating the average space occupied by the files contained in said sample of files;
   determining a first subset of files comprising each file for which said first characteristic quantity is larger than said first critical value and for which said second characteristic quantity is larger than said second critical value and which is specific by said status information to be held by said first storage space;
   determining a second subset of files comprising each file for which said first characteristic quantity is smaller than said first critical value but larger than a first threshold value, and for which said second characteristic quantity is larger than said second critical value and which is specific by said status information to be held by said first storage space;
   determining a third subset of files comprising each file for which said first characteristic quantity is larger than said first critical value and for which said second characteristic quantity is smaller than said second critical value but larger than a second threshold value and which is specific by said status information to be held by said first storage space;
   determining a fourth subset of files comprising each file for which said first characteristic quantity is smaller than said first critical value but larner than said first threshold value and for which said second characteristic quantity is smaller than said second critical value but larner than said second threshold value;
   moving a given number of files of said first subset of files from said first storage space to said second storage space if more than said given number of files are contained in said first subset of files;
   moving all files of said first subset of files from said first storage space to said second storage space if less than said given number of files are contained in said first subset of space and moving the remaining number of files of said second subset of files or of said third subset or of said fourth subset of files so that in total said given number of files is moved from said first storage space to said second storage space; and updating said first subset of files, said second subset of files, said third subset of files, and said fourth subset of files;

wherein said first subset of files, said second subset of files, said third subset of files, and said fourth subset of files are determined dynamically before said given number of files is moved from said first storage space to said second storage space, and wherein files from said fourth subset of files are only moved if not sufficient files are contained in the first subset of state, in the second subset of states, and in the third subset of states.

2. The method according to claim 1, wherein said file index is regenerated depending on the number of new files added to the mass storage system or depending on the number of files contained in the first, second, third or fourth subset of files.

3. The method according to claim 1, wherein said mass storage system is a hierarchical storage management system, wherein said first storage space is provided by a tier one storage device, and wherein said second storage space is provided by a tier two storage device.

4. The method according to claim 1, wherein said first storage space and said second store space is provided by one storage device or wherein said first storage space and said second storage space is provided by two separate storage devices.

5. The method according to claim 1, wherein said file index is generated by use of a hash algorithm, wherein said hash algorithm is used for storing and retrieving the attributes and the information status of each file held by said first or said second storage space in said file index, and wherein said first and said second characteristic quantities are comprised in the attributes of each file.

6. A computer program product comprising computer executable instructions for causing a computer to perform a method for managing a mass storage system, wherein said mass storage system comprises a first storage space and a second storage space, the computer program product comprising:

a storage medium readable by a processing circuit and storing instructions for execution by the processing circuit for performing operations comprising:

generating a file index, said file index listing in a uniformly distributed way each file along with a first characteristic quantity, a second characteristic quantity, and a status information, said status information specifying if said file is held on said first storage space or on said second storage space;

wherein said first characteristic quantity specifies the age of a file and wherein said second characteristic quantity specifies the size of a file;

selecting a sample of files from said file index, said sample of files containing a given number of files, wherein said status information of each file of said given number of files specifying said file to be held on said first storage space;

using said first characteristic quantity of each file of said sample of files to determine a single first critical value;

using said second characteristic quantity of each file of said sample of files to determine a single second critical value;

wherein said first critical value is determined by calculating the average age of the files contained in said sample of files, and wherein said second critical value is determined by calculating the average space occupied by the files contained in said sample of files;

determining a first subset of files comprising each file for which said first characteristic quantity is larger than said first critical value and for which said second characteristic quantity is larger than said second critical value and which is specific by said status information to be held by said first storage space;

determining a second subset of files comprising each file for which said first characteristic quantity is smaller than said first critical value but larger than a first threshold value, and for which said second characteristic quantity is larger than said second critical value and which is specific by said status information to be held by said first storage space;

determining a third subset of files comprising each file for which said first characteristic quantity is larger than said first critical value and for which said second characteristic quantity is smaller than said second critical value but larger than a second threshold value and which is specific by said status information to be held by said first storage space;

determining a fourth subset of files comprising each file for which said first characteristic quantity is smaller than said first critical value but lamer than said first threshold value and for which said second characteristic quantity is smaller than said second critical value but lamer than said second threshold value;

moving a given number of files of said first subset of files from said first storage space to said second storage space if more than said given number of files are contained in said first subset of files;

moving all files of said first subset of files from said first storage space to said second storage space if less than said given number of files are contained in said first subset of space and moving the remaining number of files of said second subset of files or of said third subset or of said fourth subset of files so that in total said given number of files is moved from said first storage space to said second storage space; and updating said first subset of files, said second subset of files, said third subset of files, and said fourth subset of files;

wherein said first subset of files, said second subset of files, said third subset of files, and said fourth subset of files are determined dynamically before said given number of files is moved from said first storage space to said second storage space, and wherein files from said fourth subset of files are only moved if not sufficient files are contained in the first subset of state, in the second subset of states, and in the third subset of states.

7. A data processing system for managing a mass storage system, said mass storage system comprising a first storage space and a second storage space, said data processing system comprising:

means for generating a file index, said file index listing in a uniformly distributed way each file along with a first characteristic quantity, a second characteristic quantity, and a status information, said status information specifying if said file is held on said first storage space or on said second storage space;

wherein said first characteristic quantity specifies the age of a file and wherein said second characteristic quantity specifies the size of a file;

means for selecting a sample of files from said file index, said sample of files containing a given number of files, wherein said status information of each file of said given number of files specifying said file to be held on said first storage space;

means for using said first characteristic quantity of each file of said sample of files to determine a single first critical value;

means for using said second characteristic quantity of each file of said sample of files to determine a single second critical value;

wherein said first critical value is determined by calculating the average age of the files contained in said sample of files, and wherein said second critical value is determined by calculating the average space occupied by the files contained in said sample of files;

means for determining a first subset of files comprising each file for which said first characteristic quantity is larger than said first critical value and for which said second characteristic quantity is larger than said second critical value and which is specific by said status information to be held by said first storage space;

means for determining a second subset of files comprising each file for which said first characteristic quantity is smaller than said first critical value but larger than a first threshold value, and for which said second characteristic quantity is larger than said second critical value and which is specific by said status information to be held by said first storage space;

means for determining a third subset of files comprising each file for which said first characteristic quantity is lamer than said first critical value and for which said second characteristic quantity is smaller than said second critical value but larger than a second threshold value and which is specific by said status information to be held by said first storage space;

means for determining a fourth subset of files comprising each file for which said first characteristic quantity is smaller than said first critical value but larger than said first threshold value and for which said second characteristic quantity is smaller than said second critical value but larger than said second threshold value;

means for moving a given number of files of said first subset of files from said first storage space to said second storage space if more than said given number of files are contained in said first subset of files;

means for moving all files of said first subset of files from said first storage space to said second storage space if less than said given number of files are contained in said first subset of space and moving the remaining number of files of said second subset of files or of said third subset or of said fourth subset of files so that in total said given number of files is moved from said first storage space to said second storage space; and means for updating said first subset of files, said second subset of files, said third subset of files, and said fourth subset of files;

wherein said first subset of files, said second subset of files, said third subset of files, and said fourth subset of files are determined dynamically before said given number of files is moved from said first storage space to said second storage space, and wherein files from said fourth subset of files are only moved if not sufficient files are contained in the first subset of state, in the second subset of states, and in the third subset of states.

8. The data processing system according to claim 7, wherein said mass storage system is a hierarchical storage management system, wherein said first storage space is provided by a tier one storage device, and wherein said second storage space is provided by a tier two storage device.

9. The data processing system according to claim 7, wherein said first storage space and said second store space is provided by one storage device or wherein said first storage space and said second storage space is provided by two separate storage devices.

10. The data processing system according to claim 7, wherein said file index is generated by use of a hash algorithm, wherein said hash algorithm is used for storing and retrieving the attributes and the information status of each file held by said first or said second storage space in said file index, and wherein said first and said second characteristic quantities are comprised in the attributes of each file.

* * * * *